May 13, 1947.  W. J. MORRILL  2,420,552
DRIVING MECHANISM
Filed Dec. 5, 1942
Fig.1.
Fig.2.
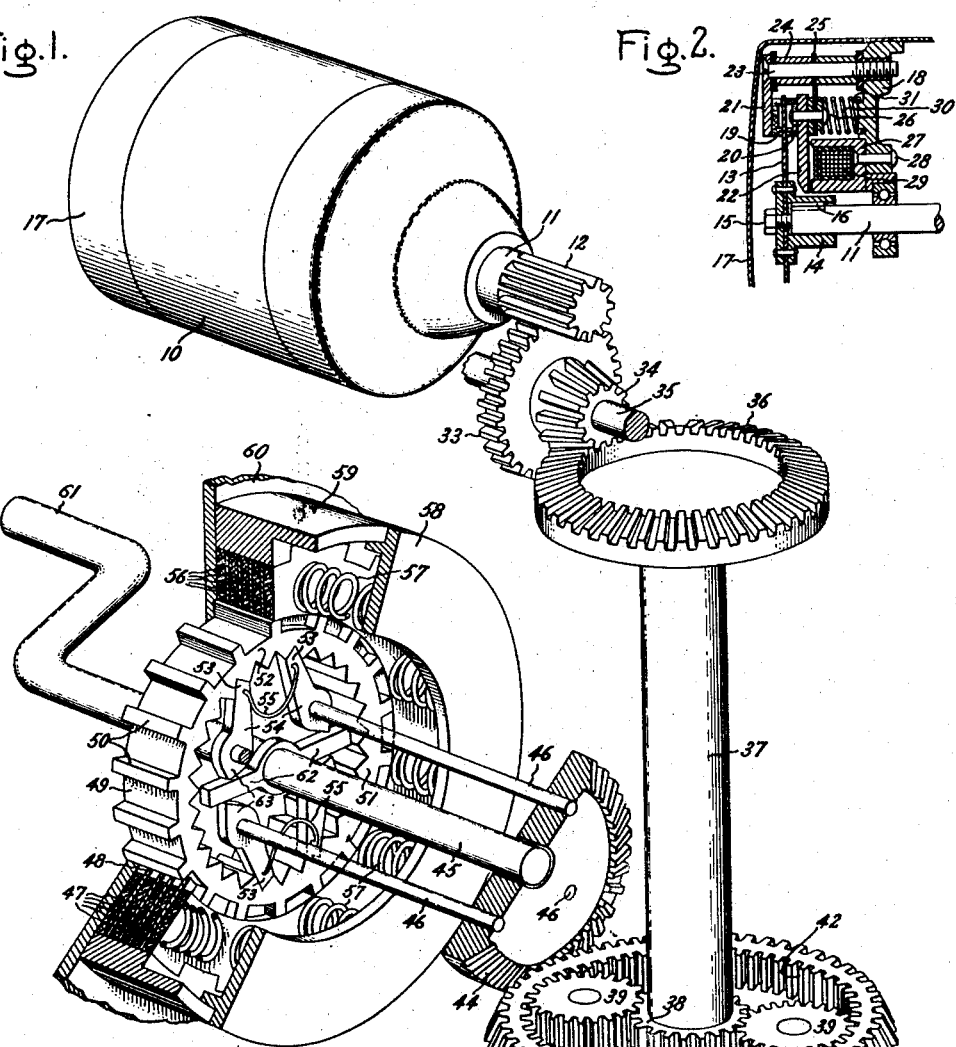
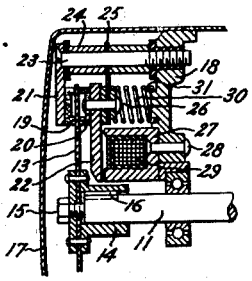
Fig.3
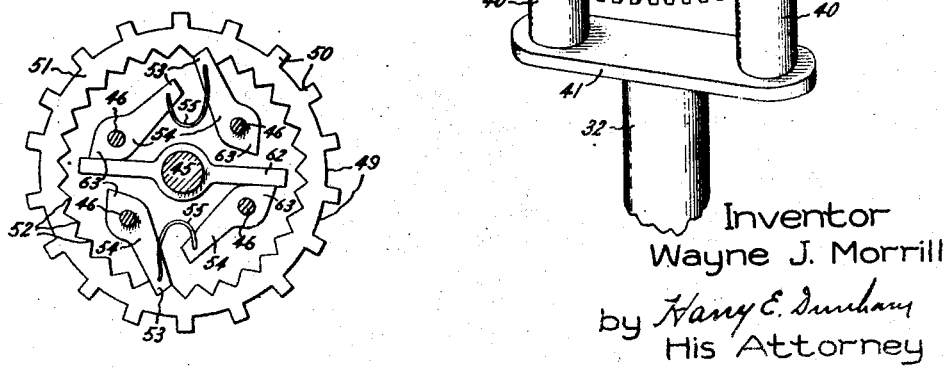
Inventor
Wayne J. Morrill
by Harry E. Dunham
His Attorney Patented May 13, 1947

2,420,552

UNITED STATES PATENT OFFICE 2,420,552

DRIVING MECHANISM

Wayne J. Morrill, Fort Wayne, Ind., assignor to General Electric Company, a corporation of New York Application December 5, 1942, Serial No. 467,982

22 Claims. (Cl. 74—282)

My invention relates to driving mechanisms and particularly to a driving mechanism of a selective engagement character wherein torque may be selectively transmitted to the driven member from a plurality of sources of power.

An object of my invention is to provide an improved driving mechanism provided with a plurality of sources of driving torque.

Another object of my invention is to provide an improved driving mechanism wherein a pair of driving sources is adapted selectively to transmit torque from one or the other of the driving sources to a single driven member.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a diagrammatic illustration of a driving mechanism embodying my invention; Fig. 2 is a partial sectional view of part of a brake mechanism enclosed in the motor casing shown in Fig. 1; and Fig. 3 is an end view of the pawl and ratchet two-way drive associated with the slip clutch shown in Fig. 1.

Referring to the drawing, I have shown a driving mechanism in which a pair of sources of mechanical power is arranged selectively to drive a common driven member. One of these sources of power includes an electric motor 10 arranged as a driving member and provided with a drive shaft 11 on which spur gear teeth 12 are formed. The motor is provided with a conventional winding energized by a suitable source of electrical power supply and is adapted to be held stationary by an electromagnetic brake when the motor is deenergized and not in driving operation. The brake includes a friction holding plate 13 mounted on a hub 14 secured by a bolt 15 and key 16 to the end of the motor shaft 11 opposite the spur gear 12. This brake mechanism is entirely enclosed within the motor casing by a cover 17 which is fastened over the motor bearing bracket 18. The brake plate 13 is adapted to be held stationary by two friction rings 19 and 20 mounted on rigid brake rings 21 and 22, respectively. The brake ring 21 is rigidly fastened to the bearing bracket 18 by a bolt 23 and is spaced from the mounting ring 22 by a spacer bushing 24 arranged about the mounting bolt 23. The mounting ring 22 is supported by a flexible ring 25 to which it is secured by rivets 26 to provide for relative axial movement of the mounting ring 22 relative to the brake disk 13. The mounting ring 22 is formed of magnetic material and is adapted to react electromagnetically with a U-section core 27 of magnetic material which is mounted on the bearing bracket 18 by rivets 28. Excitation is adapted to be provided to the core 27 by a toroidal coil 29 arranged within the core 27 and adapted to be energized when the motor 10 is energized. A plurality of circumferentially spaced apart compression coil springs 30 is arranged on spring seats 31 formed on the bearing bracket 18 and in engagement with the adjacent side of the flexible supporting ring 25 for biasing the inner end of the supporting ring 25 and the mounting ring 22 toward the brake disk 13 to provide a friction engagement between the brake disk 13 and the friction rings 19 and 20. When the motor 10 and the brake excitation coil 29 are energized, the mounting ring 22 will be drawn toward the core 27 by the electromagnetic attraction of the core 27 and will deflect the supporting ring 26 and compress the springs 30, thereby drawing the friction surface 20 away from the brake disk 13 and permitting a slight axial movement of the brake disk 13 away from the friction ring 19, thereby releasing the brake and permitting the motor shaft 11 to turn freely. When the motor is inoperative, the brake exciting coil 29 is deenergized and the springs 30 again bias the friction surface 20 against the brake disk 13 and against the friction ring 19 to hold stationary the motor drive shaft 11.

The motor 10 is adapted to provide a driving torque to a driven shaft 32 through a set of gearing which engages the spur gear 12 formed on the motor driving shaft 11. The gear 12 is arranged in engagement with an intermediate gear 33 formed integral with a bevel gear 34 mounted on a countershaft 35. The bevel gear 34 is arranged in engagement with a second bevel gear 36 mounted on a shaft 37 arranged to drive a sun gear 38 secured to the shaft 37 and adapted to transmit torque through a planetary gearing system to the driven shaft 32. This planetary gearing includes a pair of planets 39 rotatably supported by the driven shaft 32, by being mounted for rotation on shafts 40 secured to a cross arm or planet cage 41 which is rigidly secured to the driven shaft 32. Torque is adapted to be transmitted from the sun gear 38 to the rotatable planet gears 39, and these planet gears are adapted to drive the driven shaft 32 by engagement with an internal ring gear 42 adapted to be held stationary through a slip clutch and two-way pawl and ratchet drive mechanism. In order to insure against damage to the driven mechanism, the ring gear 42 is adapted to be held stationary below a predetermined torque to provide a driving connection between the sun gear 38 and the driven shaft 32 through the planet gears 39 and their mounting shafts 40 and to be released above a predetermined torque to allow for rotation of the ring gear 42 by planet gears 39, thereby releasing the driving connection between the motor drive shaft 11 and the driven shaft 32. This holding and releasing mechanism includes a bevel gear 43 formed integral with the ring gear 42 and arranged in engagement with another bevel gear 44 rotatably mounted about a second drive shaft 45 and supported on pawl mounting shafts 46 which are normally adapted to be held stationary by a slip brake. This slip brake includes a plurality of plates 47 formed with radially projecting teeth 48 which extend into grooves 49 formed between teeth 50 on a ratchet wheel 51. The inner surface of the ratchet wheel 51 is formed with ratchet teeth 52 which are adapted to be engaged by the outer ends 53 of pawls 54 mounted on the pawl shafts or rods 46. These pawls are arranged in pairs which are biased apart and into engagement with the ratchet teeth 52 by biasing springs 55 arranged in engagement with the outer ends 53 of the pawls 54, thereby providing a driving connection between the pawls 54 and the ratchet wheel 51. The ratchet wheel is adapted to be held stationary by the brake plates 47 which are normally arranged in friction engagement with a plurality of friction plates 56 arranged intermediate the plates 47 and resiliently biased together by a plurality of circumferentially spaced apart compression coil springs 57 which engage the inner friction plate 56 and a brake end plate 58 which is rigidly secured to a brake housing 59 supported on a mounting plate 60. The slip brake is adapted to prevent rotation of the ratchet wheel 51 below a predetermined torque transmitted to the ratchet wheel 51 by the pawls 54 through the pawl shafts 46 of the bevel gear 44 from the ring gear 42. This preloading of the slip brake is determined by the preloading compression of the springs 57 acting on the friction surface plates 56 and is arranged such that if the driven shaft 32 should be overloaded or stalled, with the result that the planet supporting shafts 40 cannot revolve about the sun gear 38, the torque transmitted to the planet gears 39 by the sun gear 38 will be transmitted through the ring gear 42 and the pawl and ratchet device to the slip brake plates 47, and these plates will turn relative to the friction plates 56, thereby permitting rotation of the ratchet wheel 51, the ratchet pawls 54 and their supporting shafts 46, and allowing rotation of the ring gear 42. This results in the rotation of the planets 39 about their supporting shafts 40 without rotation of the shafts 40 and prevents the transmittal of injurious torques to the driven shaft 32 above a predetermined safe operating value.

Under certain circumstances, the motor 10 may be inoperative due to a failure in the source of electrical power supply, and the motor drive shaft 11 is held stationary by the electromagnetic brake within the motor housing. It may be desirable under these circumstances to operate the driven shaft 32, and for this purpose, a second source of power is provided which includes a manually operable crank 61 which is rigidly secured to the second drive shaft 45 by being formed integral therewith. The second drive shaft 45 is adapted to supply a driving torque to the driven shaft 32 when the hand crank 61 is operated through the pawl shafts 46 and the planetary gearing. A driving connection is illustrated more clearly in Fig. 3 in which the second drive shaft 45 is shown as being rotated in a clockwise direction by the hand crank 61. As shown in this figure, when the second drive shaft 45 is turned by the hand crank 61, an operating bar 62 engages cam surfaces 63 on a pawl 54 of each pair of pawls and biases the outer ends 53 of these two pawls out of engagement with the teeth 52 of the ratchet wheel 51 and provides a driving engagement between the pawl shafts 46 and the second drive shaft 45 through the operating bar 62 and the pawls 54. Thus, if the sun gear 38 is held stationary by the electromagnetic motor brake and the hand crank 61 is rotated, torque can be transmitted through the second drive shaft 45 to the pawl shafts 46, through the bevel gears 44 and 43 to the planetary ring gear 42. Rotation of the ring gear 42 produces rotation of the planet gears 39 about the sun gear 38, thereby driving the planet supporting shafts 40 and the driven shaft 32. With this drive, the pawls 54 which are not biased out of engagement with the ratchet teeth 52 are adapted to slip over the ratchet teeth, as can readily be seen from the position of the pawls in Fig. 3. When the hand crank 61 is released, the biasing springs 55 again bias all four pawls 54 into engagement with the ratchet teeth 52 and hold the ring gear 42 stationary through the slip brake. This again places the entire driving mechanism in condition for driving operation by either the motor 10 or the hand crank 61, as desired.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A driving mechanism including a pair of driving means, a driven member common to both of said driving means, means for providing a driving connection between one of said driving means and said driven member below a predetermined torque and having a rotatable means for releasing said driving connection above said predetermined torque, means for holding said one driving means stationary when not in driving operation, and other means associated with said rotatable release means for providing a driving connection between the other of said driving means and said driven member when said one driving means is inoperative and held stationary by said holding means.

2. A driving mechanism including a pair of driving means, a driven member common to both of said driving means, resiliently preloaded means for providing a driving connection between one of said driving means and said driven member below a predetermined torque and being rotatable for releasing said driving connection above said predetermined torque, means for holding said one driving means stationary when not in driving operation, and other means associated with said rotatable release means for providing a driving connection between the other of said driving means and said driven member when said one driving means is inoperative and held stationary by said holding means.

3. A driving mechanism including a pair of driving means, a driven member common to both of said driving means, one of said driving means including an electric motor, means including a brake for providing a driving connection between said one of said driving means and said driven member below a predetermined torque and having a rotatable means for releasing said driving connection above said predetermined torque, means including an electro-magnetic brake for holding said one driving means stationary when said electric motor is not energized, and other means associated with said rotatable release means for providing a driving connection between the other of said driving means and said driven member when said motor is deenergized and held stationary by said holding means.

4. A driving mechanism including a pair of driving means, a driven member common to both of said driving means, resiliently preloaded means for providing a driving connection between said one of said driving means and said driven member below a predetermined torque and having a rotatable means for releasing said driving connection above said predetermined torque, means for holding said one driving means stationary when not in driving operation, said other driving means including a manually operable member, and other means associated with said rotatable release means for providing a driving connection between said manually operable member and said driven member when said one of said driving means is inoperative and held stationary by said holding means.

5. A driving mechanism including a pair of driving means, a driven member common to both of said driving means, one of said driving means including an electric motor, resiliently preloaded means for providing a driving connection between said one of said driving means and said driven member below a predetermined torque and being rotatable for releasing said driving connection above said predetermined torque, means for holding said one driving means stationary when said electric motor is not energized, said other driving means including a manually operable member, and other means associated with said rotatable release means for providing a driving connection between said manually operable member and said driven member when said motor is deenergized and held stationary by said holding means.

6. A driving mechanism including a pair of driving means, a driven member common to both of said driving means, resiliently preloaded means including a brake for providing a driving connection between said one of said driving means and said driven member below a predetermined torque and having a rotatable brake member for releasing said driving connection above said predetermined torque, means including an electromagnetic brake for holding said one driving means stationary when not in driving operation, said other driving means including a manually operable member, and other means associated with said rotatable release member for providing a driving connection between said manually operable member and said driven member when said one of said driving means is inoperative and held stationary by said electromagnetic brake holding means.

7. A driving mechanism including a pair of driving means, a driven member common to both of said driving means, one of said driving means including an electric motor, means for providing a driving connection between said one of said driving means and said driven member below a predetermined torque and having a rotatable means for releasing said driving connection above said predetermined torque, means including an electromagnetic brake for holding said one driving means stationary when said electric motor is not energized, said other driving means including a manually operable member, and other means associated with said rotatable release means for providing a driving connection between said manually operable member and said driven member when said motor is deenergized and held stationary by said electromagnetic brake holding means.

8. A driving mechanism including a pair of driving means, a driven member common to both of said driving means, resiliently preloaded means including a slip brake and a pawl and ratchet two-way drive for providing a driving connection between said one of said driving means and said driven member below a predetermined torque and for releasing said driving connection above said predetermined torque, means for holding said one driving means stationary when not in driving operation, said other driving means including a manually operable member for releasing said pawl and ratchet brake drive associated with said release means for providing a driving connection between said manually operable member and said driven member when said one of said driving means is inoperative and held stationary by said holding means.

9. A driving mechanism including a pair of driving means, a driven member common to both of said driving means, resiliently preloaded means including a slip brake for providing a driving connection between said one of said driving means and said driven member below a predetermined torque and for releasing said driving connection above said predetermined torque, means including an electromagnetic brake for holding said one driving means stationary when not in driving operation, said other driving means including a manually operable member, and other means associated with said release means for providing a driving connection between said manually operable member and said driven member when said one of said driving means is inoperative and held stationary by said electromagnetic brake holding means.

10. A driving mechanism including a pair of driving means, a driven member common to both of said driving means, means including a planetary gearing for providing a driving connection between one of said driving means and said driven member, said planetary gearing including a sun gear arranged to be driven by said one of said driving means, a ring gear, planet gears arranged in engagement with said sun and ring gears, means for holding stationary said ring gear below a predetermined torque to provide said driving connection and for releasing said driving connection above said predetermined torque, means for holding said sun gear stationary when not in driving operation, and other means associated with said release means for providing a driving connection between said other driving means and said driven member when said one of said driving means is inoperative and said sun gear held stationary by said holding means.

11. A driving mechanism including a pair of driving means, a driven member common to both of said driving means, means including a planetary gearing for providing a driving connection between one of said driving means and said driven member, said planetary gearing including a gear arranged to be driven by said one of said driving means, a second gear, planet gears arranged in engagement with said driven and second gears, resiliently preloaded means for holding stationary said second gear below a predetermined torque to provide said driving connection and for releasing said driving connection above said predetermined torque, electromagnetic means for holding said first gear stationary when not in driving operation, and other means associated with said release means for providing a driving connection between said other driving means and said driven member when said one of said driving means is inoperative and held stationary by said electromagnetic holding means.

12. A driving mechanism including a pair of driving means, a driven member common to both of said driving means, means including a planetary gearing for providing a driving connection between one of said driving means and said driven member, said planetary gearing including a sun gear arranged to be driven by said one of said driving means, a ring gear, planet gears arranged in engagement with said sun and ring gears, resiliently preloaded means for holding stationary said ring gear below a predetermined torque to provide said driving connection and for releasing said driving connection above said predetermined torque, electromagnetic means for holding said sun gear stationary when not in driving operation, and other means associated with said release means for providing a driving connection between said other driving means and said driven member when said one of said driving means is inoperative and said sun gear held stationary by said electromagnetic holding means.

13. A driving mechanism including a pair of driving means, a driven member common to both of said driving means, means including a planetary gearing for providing a driving connection between one of said driving means and said driven member, said planetary gearing including a sun gear arranged to be driven by said one of said driving means, a ring gear, planet gears arranged in engagement with said sun and ring gears, resiliently preloaded means for holding stationary said ring gear below a predetermined torque to provide said driving connection and for releasing said driving connection above said predetermined torque, means for holding said sun gear stationary when not in driving operation, and other means associated with said release means for providing a driving connection between said other driving means and said driven member when said one of said driving means is inoperative and said sun gear held stationary by said holding means.

14. A driving mechanism including a pair of driving means, a driven member common to both of said driving means, one of said driving means including an electric motor, means including a planetary gearing for providing a driving connection between said one of said driving means and said driven member, said planetary gearing including a sun gear arranged to be driven by said electric motor, a ring gear, planet gears arranged in engagement with said sun and ring gears, means for holding stationary said ring gear below a predetermined torque to provide said driving connection and for releasing said driving connection above said predetermined torque, electromagnetic means for holding said one driving means stationary when said electric motor is not energized, and other means associated with said release means for providing a driving connection between said other driving means and said driven member when said motor is deenergized and said one driving means held stationary by said holding means.

15. A driving mechanism including a pair of driving means, a driven member common to both of said driving means, one of said driving means including an electric motor, means including a planetary gearing for providing a driving connection between said one of said driving means and said driven member, said planetary gearing including a sun gear arranged to be driven by said electric motor, a ring gear, planet gears arranged in engagement with said sun and ring gears, means for holding stationary said ring gear below a predetermined torque to provide said driving connection and for releasing said driving connection above said predetermined torque, electromagnetic means for holding said one driving means stationary when said electric motor is not energized, and other means associated with said release means for providing a driving connection between said other driving means and said driven member when said motor is deenergized and said one driving means held stationary by said electromagnetic holding means.

16. A driving mechanism including a pair of driving means, a driven member common to both of said driving means, one of said driving means including an electric motor, means including a planetary gearing for providing a driving connection between said one of said driving means and said driven member, said planetary gearing including a sun gear arranged to be driven by said electric motor, a ring gear, planet gears arranged in engagement with said sun and ring gears, means for holding stationary said ring gear below a predetermined torque to provide said driving connection and for releasing said driving connection above said predetermined torque, electromagnetic means for holding said one driving means stationary when said electric motor is not energized, said other driving means including a manually operable member, and other means associated with said release means for providing a driving connection between said manually operable member and said driven member when said motor is deenergized and held stationary by said electromagneaic holding means.

17. A driving mechanism including a pair of driving means, a driven member common to both of said driving means, one of said driving means including an electric motor, means including a planetary gearing for providing a driving connection between said one of said driving means and said driven member, said planetary gearing including a sun gear arranged to be driven by said electric motor, a ring gear, planet gears arranged in engagement with said sun and ring gears and rotatably supported by said driven member, resiliently preloaded means for holding stationary said ring gear below a predetermined torque to provide said driving connection and for releasing said driving connection above said predetermined torque, electromagnetic means for holding said sun gear stationary when not in driving operation, and other means associated with said release means for providing a driving connection between said other driving means and said driven member when said one of said driving means is inoperative and said sun gear held stationary by said electromagnetic holding means.

18. A power unit including a housing, a driven shaft rotatably mounted in said housing, a power shaft rotatably mounted in said housing, a planetary gear structure associated with said driven shaft for transmitting torque thereto, a gear train between said planetary gear structure and said drive shaft, and an overload release brake means associated with said planetary gear structure for maintaining said planetary gear structure in driving relationship between said driven shaft and said gear train below a predetermined torque and having a rotatable means for releasing said driving relationship above said predetermined torque.

19. A power unit including a housing, a driven shaft rotatably mounted in said housing, a power shaft rotatably mounted in said housing, a planetary gear structure associated with said driven shaft for transmitting torque thereto, a gear train between said planetary gear structure and said drive shaft, an overload release brake means associated with said planetary gear structure for maintaining said planetary gear structure in driving relationship between said driven shaft and said gear train below a predetermined torque and having a rotatable means for releasing said driving relationship above said predetermined torque, a manually operable drive shaft rotatably mounted within said housing, and a gear train for transmitting a driving torque from said manually operable shaft to said planetary gear structure and said driven shaft through said brake rotatable release means.

20. A power unit including a housing, a driven shaft rotatably mounted in said housing, a power shaft rotatably mounted in said housing, a planetary gear structure associated with said driven shaft for transmitting torque thereto, a gear train between said planetary gear structure and said drive shaft, an overload release brake means associated with said planetary gear structure for maintaining said planetary gear structure in driving relationship between said driven shaft and said gear train below a predetermined torque and having a rotatable means for releasing said driving relationship above said predetermined torque, a manually operable drive shaft rotatably mounted in said housing, a gear train for transmitting torque from said manually operable drive shaft to said planetary gear structure and said driven shaft, and means operatively connecting said manually operable drive shaft with said brake release means for releasing said brake release means, permitting the planetary gear structure to rotate freely on rotation of said manually operable drive shaft.

21. A power unit including a housing, a driven shaft rotatably mounted in said housing, a power shaft rotatably mounted in said housing, a planetary gear structure associated with said driven shaft for transmitting torque thereto, a gear train between said planetary gear structure and said drive shaft, an overload release brake means associated with said planetary gear structure for maintaining said planetary gear structure in driving relationship between said driven shaft and said gear train below a predetermined torque and having a rotatable means for releasing said driving relationship above said predetermined torque, a manually operable drive shaft rotatably supported in said housing, driving means between said manually operable drive shaft and said planetary gear structure for imparting rotation thereto and to said driven shaft, and means between said manually operable drive shaft and said brake means for normally holding said manually operable drive shaft against rotation and for releasing said brake means on rotation of said manually operable drive shaft.

22. A power unit, including a housing, a power drive shaft rotatably mounted therein, a driving motor operatively connected to said power drive shaft, a brake associated with the driving motor, whereby the motor will be locked against rotation when it is not operating and will be released when operating, a manually operated drive shaft rotatably mounted within said housing, means holding the manually operated driven shaft against rotation while the power driven shaft is operating and releasing the manually operated driven shaft for rotation when said shaft is manually rotated, a driven shaft rotatably supported within said housing, gearing operatively associating the two drive shafts and the driven shaft, whereby rotation of the driven shaft will be effected when either of the drive shafts is being rotated and the other drive shaft is being held against rotation, and an overload brake associated with the manually operated drive shaft and said gearing, whereby a predetermined resistance to torque on the driven shaft when driven by the power shaft will be relieved by slippage of said brake.

WAYNE J. MORRILL.

REFERENCES CITED

The following references are of record in the file of this patent:

UNITED STATES PATENTS

| Number | Name | Date |
|---|---|---|
| 2,220,983 | Waters | Nov. 12, 1940 |
| 865,556 | Andersen | Sept. 10, 1907 |
| 1,702,479 | Mosch | Feb. 19, 1929 |
| 1,948,709 | Hackethal | Feb. 27, 1934 |
| 2,086,030 | Hodgson | July 6, 1937 |
| 2,271,640 | Heintz | Feb. 3, 1942 |
| 2,303,637 | Heintz | Dec. 1, 1942 |